(12) United States Patent
Suda et al.

(10) Patent No.: US 8,558,434 B2
(45) Date of Patent: Oct. 15, 2013

(54) ACTUATOR

(75) Inventors: Sakae Suda, Yokohama (JP); Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 13/326,172

(22) Filed: Dec. 14, 2011

(65) Prior Publication Data

US 2012/0161586 A1    Jun. 28, 2012

(30) Foreign Application Priority Data

Dec. 22, 2010 (JP) ................................. 2010-286532

(51) Int. Cl.
*H01L 41/08* (2006.01)
(52) U.S. Cl.
USPC ......................................................... 310/363
(58) Field of Classification Search
None
See application file for complete search history.

(56) References Cited

U.S. PATENT DOCUMENTS

2012/0322164 A1 * 12/2012 Lal et al. ....................... 436/501

FOREIGN PATENT DOCUMENTS

| JP | 2005-176428 A | 6/2005 |
|---|---|---|
| JP | 2006-050780 A | 2/2006 |

* cited by examiner

*Primary Examiner* — Mark Budd
(74) *Attorney, Agent, or Firm* — Canon U.S.A., Inc., IP Division

(57) ABSTRACT

Provided are an electrode having high conductivity and high durability to driving deformation, and an actuator including the electrode, the actuator having a large amount of displacement. The actuator includes a pair of electrodes arranged oppositely and an intermediate layer arranged between the pair of electrodes, the intermediate layer containing an electrolyte, and the actuator being deformed by applying a voltage to the pair of electrodes, in which at least one of the pair of electrodes includes a porous structure containing a first conductive material and having conductivity, a second conductive material, and an electrolyte, pores of the porous structure being filled with the second conductive material and the electrolyte.

5 Claims, 2 Drawing Sheets

FIG. 2A
FIG. 2B
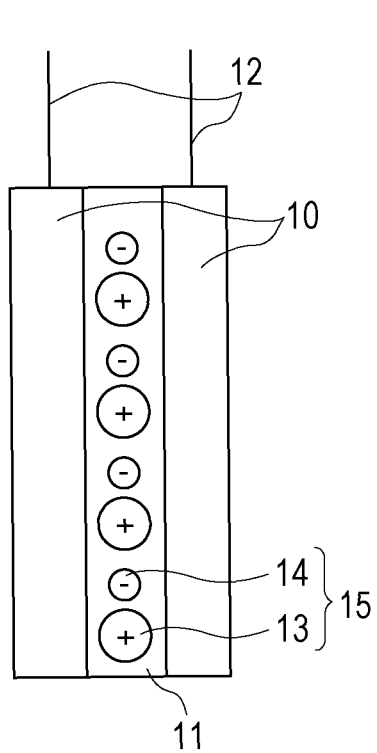
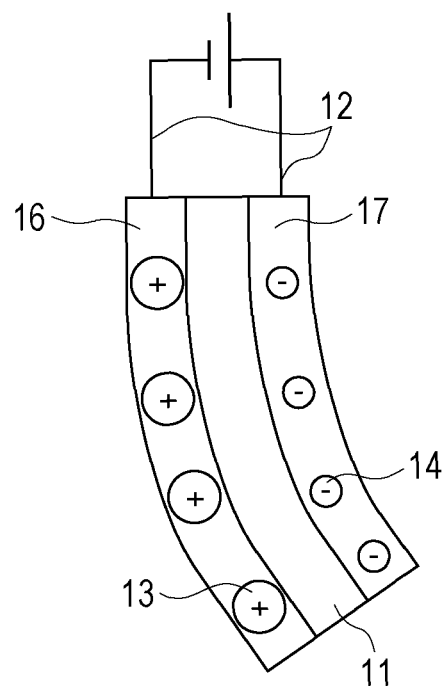

ACTUATOR

BACKGROUND OF THE INVENTION

1. Field of the Invention

The present invention relates to an actuator.

2. Description of the Related Art

There has been the development of actuators in the fields of, for example, industrial, medical, and personal robots and micromachines.

Japanese Patent Laid-Open No. 2006-050780 discloses an actuator including an electrolyte held between a pair of electrodes. Both electrodes are composed of a conductive polymer. An intermediate layer includes an ionic liquid in a polymer matrix.

Japanese Patent Laid-Open No. 2005-176428 discloses an actuator including an electrode that is composed of carbon nanotubes and a polymer serving as a binder.

Actuators of the related art have the following problems, so that the resulting displacement and durability are not sufficient.

That is, an electrode composed of a conductive polymer does not have sufficient conductivity. It is thus difficult to achieve large displacement.

In an electrode composed of carbon nanotubes and a polymer, if the concentration of the carbon nanotubes is increased in order to increase conductivity, the concentration of the polymer is reduced, thus reducing the adhesiveness between carbon nanotubes. So, in the case where a highly conductive electrode is formed, breakage, such as cracking, occurs when driving deformation is repeated, failing to achieve sufficient durability.

SUMMARY OF THE INVENTION

Aspects of the present invention provide an electrode having high conductivity and high durability to driving deformation, and an actuator including the electrode, the actuator having a large amount of displacement.

One disclosed aspect of the present invention provide an actuator including a pair of electrodes arranged oppositely and an intermediate layer arranged between the pair of electrodes, the intermediate layer containing an electrolyte, and the actuator being deformed by applying a voltage to the pair of electrodes, in which at least one of the pair of electrodes includes a porous structure containing a first conductive material and having conductivity, a second conductive material, and an electrolyte, pores of the porous structure being filled with the second conductive material and the electrolyte.

Aspects of the present invention provide the electrode achieving good balance between high conductivity and durability to driving deformation owing to the conductivity of the porous structure serving as a skeletal structure of an electrode layer and the conductive material and the electrolyte with which the pores of the porous structure are filled. Aspects of the present invention provide an actuator including the electrode, the actuator being largely displaced at a low driving voltage.

Further features of the present invention will become apparent from the following description of exemplary embodiments with reference to the attached drawings.

BRIEF DESCRIPTION OF THE DRAWINGS

FIGS. 2A and 2B are schematic views of the operation of an actuator.

DESCRIPTION OF THE EMBODIMENTS

Figure 1A:
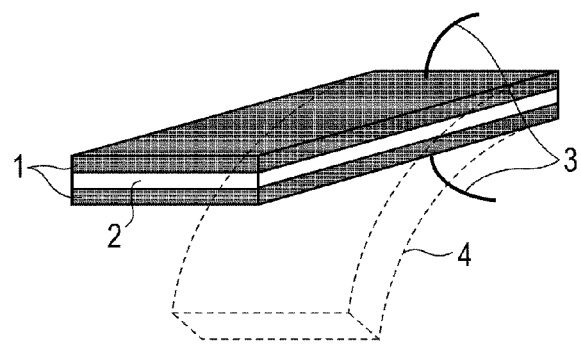
FIGS. 1A to 1C are schematic views of an actuator according to an embodiment of the present invention.

Embodiments of the present invention will be described in detail below.

An actuator according to aspects of the present invention includes a pair of electrodes arranged oppositely and an intermediate layer arranged between the pair of electrodes, the intermediate layer containing an electrolyte, and the actuator being deformed by applying a voltage to the pair of electrodes, in which at least one of the pair of electrodes includes a porous structure containing a first conductive material and having conductivity, a second conductive material, and an electrolyte, pores of the porous structure being filled with the second conductive material and the electrolyte.

According to a first embodiment of the present invention, the porous structure contains a polymer material and a first carbon material serving as the first conductive material. The first carbon material contains at least one selected from carbon black, activated carbon, porous carbon, carbon nanotubes, carbon nanofibers, and carbon fibers.

According to a second embodiment of the present invention, the porous structure contains a conductive polymer.

In any of the foregoing embodiments, the second conductive material may contain a carbon material that is at least one selected from carbon black, activated carbon, and porous carbon. The electrolyte may be an ionic liquid.

The electrode according to aspects of the present invention has the porous structure with conductivity and thus sufficient flexibility for deformation.

The electrode also contains the second conductive material and the electrolyte, thereby further improving the conductivity in the electrode. The structure having pores allows ions to be easily transferred and diffused, thus increasing the driving speed while sufficient durability to driving deformation is ensured.

Typically, the incorporation of a conductive material, such as a carbon material, into a conductive polymer improves conductivity. However, the hardness of the conductive polymer solidified by the addition of the carbon material is increased. In this case, repetitive deformation of the actuator can cause cracking, which is not preferred from the viewpoint of flexibility.

In the actuator according to aspects of the present invention, the second conductive material, such as a carbon material, is arranged in pores of the porous structure. So, the polymer constituting porous walls maintains flexibility, thus providing the actuator having flexibility to deformation and having high conductivity.

In particular, the actuator having the porous structure containing the first conductive material composed of a carbon material can be driven in a large amount of displacement and has sufficient durability to driving deformation.

Furthermore, the actuator having the porous structure that contains the first carbon material in the form of fibers has sufficient durability to deformation.

Moreover, the actuator containing the second carbon material in the form of particles arranged in the pores of the porous structure has many sites that adsorb ions.

The actuator including all these components has sufficient durability to driving deformation and can be largely deformed.

The actuator having the porous structure containing a conductive polymer has high conductivity, sufficient durability to driving deformation, and an improved driving speed.

The actuator has the porous structure containing the conductive polymer and thus has sufficient durability to deformation.

Furthermore, the carbon material is contained in the pores of the porous structure, thus resulting in the electrode having high conductivity.

The arrangement of the electrolyte in the pores of the electrode allows ions to be easily transferred and diffused. So the actuator has sufficient durability to driving deformation and is driven at a high driving speed.

Figure 1B:
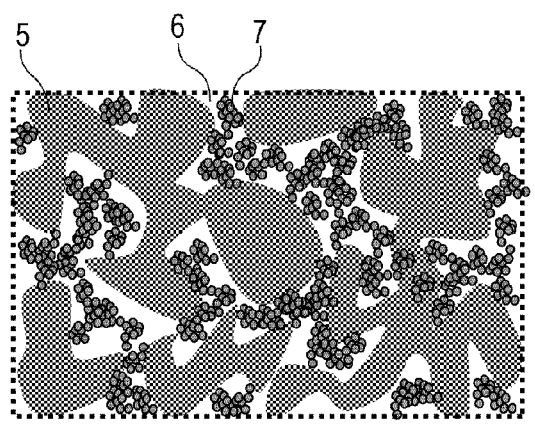
Figure 1C:
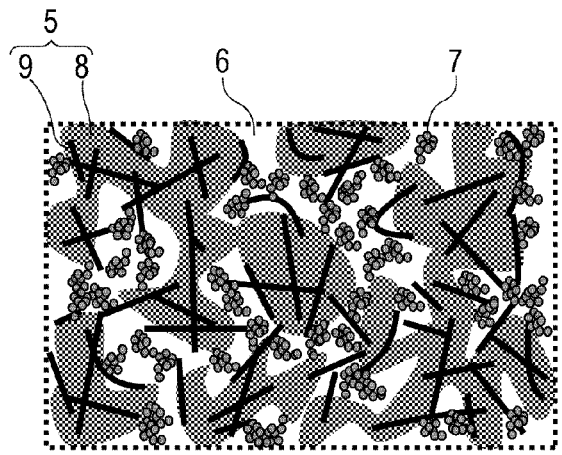

FIGS. 1A to 1C are schematic views of an actuator according to this embodiment.

FIG. 1A is a schematic view of the structure of the actuator according to this embodiment. Reference numeral 1 denotes electrodes. Reference numeral 2 denotes an intermediate layer. Reference numeral 3 denotes lead wires. The electrodes 1 are a pair of electrodes arranged oppositely. The intermediate layer 2 is arranged therebetween. In the actuator, the electrodes 1 and the intermediate layer 2 are stacked. The deformation of the electrode layers causes the bending deformation of the actuator itself. The lead wires 3, which serve as terminals configured to apply a voltage between the electrodes 1, are arranged at ends of the long electrodes.

The intermediate layer 2 and the electrodes 1 contain an electrolyte. The electrolyte is composed of cations and anions. By the application of a voltage, the cations are transferred to a negative electrode, and the anions are transferred to a positive electrode. At the negative electrode, an electric double layer is formed on a surface of the conductive material (a conductive polymer or carbon material). The electrode is expanded by the synergistic effect of steric effects of cations and electrostatic repulsion due to the electric double layer. At the positive electrode, an electric double layer is formed on a surface of the conductive material. A difference in deformation between the positive electrode and the negative electrode is caused by, for example, a difference in ion size between the positive electrode and the negative electrode, so that the electrodes are deformed so as to bend the actuator. In this figure, a state in which the actuator is deformed in the thickness direction is represented by a dotted line. For the actuator, one end, to which the lead wires 3 are attached, is used as a fulcrum, and the other end in the longitudinal direction bends largely.

In the case where the porous structure is composed of a conductive polymer, in the negative electrode, the conductive polymer tends to shrink by dedoping anions. Typically, cationic behavior is dominant, resulting in the expansion of the negative electrode. In the positive electrode, an electric double layer is also formed on a surface of a conductive polymer or carbon material. With respect to the size of ions, cations are generally larger than anions. So, the amount of deformation of a second electrode containing cations 13 is larger than that of a first electrode 17. This is presumably because of the synergistic effects of steric effects of ions present in the electrodes and electrostatic repulsion due to the electric double layers. Accordingly, the difference in size between the positive electrode and the negative electrode is caused, so that the electrodes are deformed so as to bend the actuator.

FIG. 1B is an enlarged schematic view of the structure of the electrodes 1 of the actuator illustrated in FIG. 1A. Reference numeral 5 denotes a porous structure serving as a skeletal structure. Reference numeral 6 denotes pores. Reference numeral 7 denotes a carbon material. The porous structure 5 contains the first conductive material (conductive polymer or carbon material) and has conductivity.

Both electrodes 1 may have the structure according to aspects of the present invention. Alternatively, one of the electrodes 1 may have the foregoing structure, and the other may be formed of a metal film, such as a gold film.

The carbon material 7, which is the second conductive material, and an electrolyte are contained in the pores 6. Thus, at least part of a surface of the carbon material 7 is in direct contact with the electrolyte. The electrodes 1 have the porous structure 5 including the pores 6 filled with the carbon material 7 and the electrolyte.

Ions are easily transferred and diffused in the pores 6 because the pores 6 are filled with the electrolyte and the carbon material 7. That is, ions transferred from the intermediate layer are easily captured in or released from the electrodes compared with a non-porous electrode. Accordingly, when a voltage is applied, ions can be easily transferred in the electrodes, and the actuator can be deformed at a high driving speed.

Hence, the actuator according to aspects of the present invention has sufficient durability to driving deformation and can be driven at a high driving speed.

The porous structure according to aspects of the present invention indicates a structure including many pores. The pores include closed pores that are present independently and interconnected open pores in which pores are interconnected. The interconnected open pores may be used in view of the ease of the transfer and diffusion of cations and anions. Furthermore, the interconnected open pores may coexist with the closed pores.

Here, the term "porous structure with conductivity" indicates a structure such that the application of a voltage allows a current to flow. The conductivity of the porous structure may be checked by, for example, measuring a current in the usual manner in a state in which the carbon material 7 in the pores illustrated in FIG. 1B is removed.

The skeletal structure of the porous structure may contain at least one polymer (organic polymer). The polymer can be contained in the skeleton and can impart flexibility to the structure, thereby providing sufficient durability to deformation, such as bending. The presence of the carbon material in the pores allows ions to be readily adsorbed at the time of the application of a voltage.

The mechanical strength of the skeleton of the porous structure results in the sufficient durability of the actuator. So, the carbon material may be simply held in the pores. That is, a polymer serving as a binder is not used or is used in a small amount. Instead, the concentration of the carbon material may be increased, thereby increasing the amount of ions adsorbed and increasing the amount of displacement of the actuator.

The electrolyte is present and in contact with the surface of the carbon material in the pores, so that ions can be readily adsorbed on the surface of the carbon material at the time of the application of a voltage.

Furthermore, a polymer may be present in the pores. The polymer may be in contact with part of the carbon material and used as a binder configured to hold the carbon material in the pores.

The porous structure may have a porosity of 20% by volume to 90% by volume. A porosity of less than 20% by volume can result in a small amount of the carbon material that can be charged into the pores and can fail to achieve a large amount of displacement of the actuator. A porosity of 90% by volume can result in insufficient mechanical strength and can cause cracking and so forth during deformation.

Here, the porosity may be measured by, for example, mercury intrusion porosimetry, a gas adsorption method, or the Archimedes's method.

The size of the pores is preferably in the range of 0.5 nm to 3 mm and more preferably 1 nm to 500 μm. A pore size of less than 1 nm can fail to hold the carbon material in the pores. A pore size exceeding 500 lam can result in insufficient mechanical strength and can cause, for example, cracking during deformation. The size of the pores may be measured by, for example, mercury intrusion porosimetry, a gas adsorption method, or direct observation with a scanning electron microscope.

Each of the electrodes 1 may have a thickness of 0.1 μm to 5 mm. The planar shape of each of the electrodes 1 may have a length of 0.1 mm to 1 m and a width of 5 mm to 1 m.

The carbon material according to this embodiment in the pores may have conductivity. The conductive carbon material imparts conductivity to the electrodes. In addition, ions are adsorbed on the carbon material at the time of the application of a voltage to increase the amount of displacement of the actuator.

The carbon material according to this embodiment may be composed of carbon black, activated carbon, porous carbon, carbon nanotubes, carbon nanofibers, and carbon fibers.

Carbon black is formed of fine carbon particles that are produced by an industrial process with controlled quality and that have diameters of about 3 nm to about 500 nm. Specific examples of carbon black include, but are not particularly limited to, acetylene black, furnace black, channel black, thermal black, and Ketjen Black.

Activated carbon is a carbon material mainly containing carbon that has been subjected to chemical or physical treatment in order to increase the capability of adsorbing a solute in a gas or liquid.

Porous carbon is a carbon material mainly containing carbon having pores. Specific examples of porous carbon include, but are not particularly limited to, nanoporous carbon, mesoporous carbon, and microporous carbon, which are classified depending on pore size.

Carbon nanotubes are materials in which six-membered carbon ring networks are formed into single- or multi-walled coaxial tubes.

Carbon nanofibers are carbon materials in the form of fibers, the carbon materials each having a structure in which graphene sheets are stacked obliquely or perpendicularly to the longitudinal direction of the fiber, the carbon materials in the form of fibers having nanosized diameters. Carbon fibers are fibrous carbon materials having a carbon content of 90% or more and having the structure and properties of carbon and properties of a fiber material. Carbon fibers each have a sufficiently long length with respect to a fiber diameter. Here, the fiber diameter is in the range of 0.1 nm to 50 μm. The length is 10 or more times the fiber diameter.

One or more carbon materials according to aspects of the present invention may be contained in the pores.

The carbon material according to this embodiment may have a size of 1 nm to 50 μm in the longitudinal direction. A size of less than 1 nm can fail to sufficiently adsorb ions. A size exceeding 50 μm can fail to sufficiently charge the carbon material into the pores.

The proportion by weight of the carbon material in the electrode may be 1% by weight or more for the purpose of increasing the number of sites configured to adsorb ions to provide a large amount of displacement.

In the actuator according to this embodiment, the plane of each of the electrodes may be rectangular as illustrated in the figure. Alternatively, the plane may be circular, triangular, elliptic, or spiral.

Specific examples of the electrolyte according to aspects of the present invention include lithium fluoride, lithium bromide, sodium bromide, magnesium chloride, copper sulfate, sodium acetate, and sodium oleate. An ionic liquid may be used.

The ionic liquid is also referred to as an ordinary temperature molten salt or a fused salt. The ionic liquid is a salt that is present in a molten state in a wide temperature range including ordinary temperature (room temperature). Ionic liquids are nonvolatile at ordinary temperature. So, the use of an ionic liquid as an ion-conducting material according to aspects of the present invention enables the actuator to be driven in vacuum and air with low humidity. The ionic liquid may have a conductivity of $0.1\ Sm^{-1}$ or more.

Example of the ion liquid that may be used in aspects of the present invention include ion liquids composed of cations represented by general formulae (1) to (4) (an imidazolium ion can be used) and anions ($X^-$):

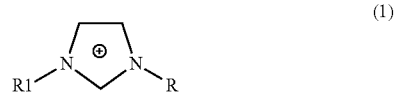

(1)

(2)

$[NRxH4-x]^+$ (3)

$[PRxH4-x]^+$ (4)

wherein in each of the formulae (1) to (4), R represents an alkyl group having 1 to 12 carbon atoms or an alkyl group including an ether linkage, the sum of carbon and oxygen atoms being in the range of 3 to 12. In formula (1), R1 represents an alkyl group having 1 to 4 carbon atoms or a hydrogen atom. In formula (1), R and R1 may not be the same. In each of formulae (3) and (4), x represents an integer of 1 to 4.

The anion ($X^-$) may be at least one selected from a tetrafluoroborate anion, a hexafluorophosphate anion, a bis(trifluoromethanesulfonyl)imidate anion, a perchlorate anion, a tris(trifluoromethanesulfonyl)carbanion, a trifluoromethanesulfonate anion, a dicyanamide anion, a trifluoroacetate anion, organic carboxylate anions, and halide ions.

The matrix of the intermediate layer may be composed of an inorganic or organic material. In the case of an organic material, the matrix may be a polymer material. The intermediate layer may be composed of an organic polymer gel, leading to an advantage in holding the electrolyte.

The intermediate layer has a thickness of 1 μm to 500 μm, a length of 0.1 mm to 1 m, and a width of 0.1 mm to 1 m. The planer shape of the intermediate layer is the same as that of each electrode.

A voltage ranging from −10 V to 10 V may be applied to the actuator according to this embodiment.

If the applied voltage is in the range of −10 V to 10 V, the actuator may be displaced in the range of 1 μm to 0.5 m.

Each of the electrode layers preferably has an electrical resistance of 1000 Ω·cm or less and more preferably 100 Ω·cm or less. An electrical resistance of each electrode of 1000 Ω·cm or less results in a sufficient amount of displacement even at a low applied voltage, for example, about 2 V.

In the case where the electrode includes the electrolyte even when no voltage is applied, the actuator is rapidly deformed when a voltage is applied.

In this case, the proportion by weight of the electrolyte in the electrode may be 80% by weight or less. A proportion exceeding 80% by weight can result in the electrode with low mechanical strength. The term "% by weight" used here indicates the proportion of the weight of the electrolyte with respect to the total weight of the electrolyte, the polymer, and the carbon material in the electrode.

The electrode has the porous structure, so that the electrolyte is transferred to a distal portion of the electrode remote from the intermediate layer. Furthermore, a large amount of the electrolyte can be captured in the electrode.

The intermediate layer may contain an ionic liquid, which is non-volatile at ordinary temperature.

The actuator according to this embodiment can be deformed in air or vacuum.

In FIG. 2B, a pair of electrodes 16 and 17 are illustrated as a positive electrode and a negative electrode, respectively. The deformation can be returned to the initial state by not applying an electric field or an extremely high electric field to cause the diffusion of ions.

While the pair of electrodes 16 and 17 are illustrated as the positive electrode and the negative electrode, respectively, in FIG. 2B, for example, the electrodes may serve as the positive electrode and the negative electrode alternately and repeatedly by AC-driving the actuator. In this case, in addition to returning the deformation, the actuator can be deformed in the opposite direction to the direction illustrated in the figure.

Method for Forming Electrode Having Porous Structure

As a method for forming the electrode having the porous structure according to aspects of the present invention, any method may be employed as long as an electrode having a porous structure is formed. Examples of a method that may be employed include, but are not limited to, an inorganic-material extraction method, a polymer extraction method, a solvent extraction method, an irradiation etching method, a foaming method, and a drawing method.

The inorganic-material extraction method is a method for forming a porous structure by dispersing at least one inorganic material in a polymer to form a polymer film and extracting the inorganic material. That is, at least one inorganic material is mixed with a polymer in a molten state or a polymer dissolved in a solvent, and is dispersed by, for example, stirring or kneading to prepare a dispersion. The dispersion is subjected to casting, spin coating, or extrusion to form an inorganic material-containing polymer film. An aggregate of an inorganic material may be immersed in a molten polymer or a polymer solution to form an inorganic material-containing polymer film. Alternatively, a monomer is polymerized on a surface of the inorganic material to prepare a polymer, thereby forming an inorganic material-containing polymer film. The resulting polymer film is immersed in a solution, for example, a fluorine compound solution, an alkaline solution, or an acidic solution, the solution dissolving the inorganic material. A difference in solubility in the solution between the inorganic material and the polymer is used to form the porous structure. Any inorganic material may be used as the inorganic material to be extracted as long as it can be dispersed in a polymer and has solubility different from that of the polymer in the solution. Non-limiting examples thereof include carbonates of alkaline-earth metals, e.g., calcium carbonate, barium carbonate, and magnesium carbonate; silicates of alkaline-earth metals, e.g., calcium silicate, barium silicate, and magnesium carbonate; phosphates of alkaline-earth metals, e.g., calcium phosphate, barium phosphate, and magnesium phosphate; metal oxides, e.g., silica, titanium oxide, iron oxide, nickel oxide, manganese oxide, and aluminum oxide; and metal hydroxides, e.g., calcium hydroxide, aluminum hydroxide, and iron hydroxide.

The polymer extraction method is a method for forming a porous structure by blending a polymer with at least one polymer to form a polymer film with a microphase-separated structure and extracting at least one polymer. That is, a polymer is blended with at least one polymer. The mixture is formed into a polymer film by casting or spin coating. The polymer that has been blended with the polymer is removed from the resulting polymer composition having a microphase-separated structure by heating or extraction with a solvent using the difference in pyrolytic properties or solubility in the solvent, thereby providing a porous structure. Any polymer may be used as the polymer to be extracted as long as the polymer has a microphase-separated structure and the pyrolytic properties or solubility in the solvent of the polymer differs from that of the polymer included in the polymer film. Non-limiting examples thereof include polyamide, polystyrene, styrene-acrylonitrile copolymers, polycarbonate, polybutylene terephthalate, polyethylene terephthalate, polyphenylene sulfide, polyvinylpyrrolidone, polysulfone, polyethersulfone, polyetheretherketone, polyamide-imide, polyimide, and polyetherimide. These polymers may be used alone or in combination as a mixture.

The solvent extraction method is a method in which a polymer film containing a solvent compatible with a polymer is immersed in a solvent incompatible with the polymer, in which both the solvents are compatible with each other. That is, the immersion of the polymer film in the solvent incompatible with the polymer causes phase separation in the polymer film or on a surface of the polymer film. Then the solvent in the polymer is extracted in the solvent in which the polymer film is immersed, thereby resulting in the polymer film having pores. The solvents used here are the combination of the solvent compatible with the polymer and the solvent incompatible with the polymer. These solvents are not particularly limited as long as they are compatible with each other.

The irradiation etching method is a method in which a polymer is irradiated with, for example, a high-energy heavy-ion beam, neutron beam, or laser beam to cause damage to portions of the polymer through which the beam has penetrated, and then is immersed in an acidic or alkaline solution to form pores centered on the penetrated portions.

The foaming method is a method for forming pores by preparing a polymer film containing a blowing agent and foaming the polymer film by, for example, heating.

The drawing method is a method for forming pores by drawing a polymer to subject the polymer to shear, thereby forming a fine fiber (with a microfibrillar structure).

These methods may be employed alone or in combination.

Any method may be employed as a method for producing an electrode according to aspects of the present invention, the electrode having a porous structure, and an electrolyte and a carbon material being contained in the pores, as long as the electrode is produced. For example, there is a method in which a porous polymer film prepared by the foregoing method is immersed in a dispersion of a carbon material dispersed in an electrolyte-containing dispersion medium in a vacuum state to replace a gas in the porous structure with the dispersion. This method enables us to charge the electrolyte and the carbon material into the pores, thereby providing the electrode having the porous structure and containing the electrolyte and the carbon material in the pores. A dispersion medium that can disperse the carbon material therein may be used as the dispersion medium. For example, in the case where an ionic liquid is used, the ionic liquid is also held in the pores.

Structure of Intermediate Layer

The electrolyte-containing intermediate layer according to aspects of the present invention may contain a polymer. Any polymer may be used as long as it has flexibility and it can be deformed in response to the deformation of the actuator. The polymer may be less likely to be hydrolyzed and may be stable in air.

Specific examples thereof include polyolefin polymers, such as polyethylene and polypropylene; polyarylenes (aromatic polymers), such as polystyrene, polyimide, poly(p-phenylene oxide), poly(2,6-dimethylphenylene oxide), and poly(p-phenylene sulfide); polymers in which a sulfonate group (—SO$_3$H), a carboxy group (—COOH), a phosphate group, a sulfonium group, an ammonium group, a pyridinium group, and so forth are incorporated in polyolefin, polystyrene, polyimide, polyarylenes (aromatic polymers), and so forth; fluorine-containing polymers, such as polytetrafluoroethylene and polyvinylidene fluoride; perfluorosulfonic acid polymers, perfluorocarboxylic acid polymers, and perfluorophosphoric acid polymers in which a sulfonate group, a carboxy group, a phosphate group, a sulfonium group, an ammonium group, a pyridinium group, and so forth are incorporated in skeletons of fluorine-containing polymers; polybutadiene compounds; elastomers and gels composed of polyurethane compounds; silicone; polyvinyl chloride; polyethylene terephthalate; polyamide, such as nylon; and polyarylate.

Among these polymers, particular examples of the polymers that may be used include polyvinylidene fluoride-hexafluoropropylene copolymers [PVdF (HFP)], polyvinylidene fluoride (PVdF), perfluorosulfonic acid, 2-hydroxyethyl methacrylate (HEMA), polymethyl methacrylate (PMMA), polyethylene oxide (PEO), and polyacrylonitrile (PAN). These polymers may be used when the electrolyte is an ionic liquid.

The polymers according to aspects of the present invention may have the same type of, similar, or identical polymer structures, or may have the same type of, similar, or identical functional groups.

As the polymer according to aspects of the present invention, a metal oxide having a polymer structure prepared by a sol-gel method may also be used. Examples of the metal oxide that may be used include, but are not particularly limited to, metal oxides of manganese, nickel, cobalt, and vanadium pentoxide.

As a method for producing the intermediate layer, any method may be employed as long as the electrolyte is held in the intermediate layer. For example, the following method may be used: An ionic liquid and a polymer are dissolved or dispersed in a solvent to prepare an ionic composition. The resulting composition is formed into a film by, for example, casting, spin coating, printing, or spraying. The solvent is evaporated. The film is then dried. Other examples of the method for producing the intermediate layer include a method for forming a film by heating a polymer to melt the polymer and kneading the molten polymer with an ionic material; an extrusion method; and an injection method.

An example of a method for producing an actuator is, but not particularly limited to, a method including separately producing the electrodes and the intermediate layer by the foregoing production method, stacking them in the desired order, and fusing them by heat and pressure using, for example, a hot press to form a laminate.

In the case where an ionic liquid is used as the electrolyte, a voltage applied to the actuator may be in the range such that the ionic liquid is not decomposed (potential window). For example, if the ionic liquid is 1-butyl-3-methylimidazolium tetrafluoroborate, a voltage applied to the actuator may be 4.9 V or less because the potential window is 4.9 V.

First Embodiment (Porous Structure Containing Polymer Material and Carbon Material)

A first embodiment of the present invention will be described in detail below.

An actuator according to aspects of the present invention includes a pair of electrodes arranged oppositely and an intermediate layer arranged between the pair of electrodes, the intermediate layer containing an electrolyte, in which at least one of the pair of electrodes has a porous structure containing a carbon material, and the porous structure contains a first carbon material in the form of fibers and a second carbon material in the form of particles, the second carbon material being contained in pores.

In this embodiment, each electrode has the porous structure containing the first carbon material in the form of fibers and thus has sufficient durability to deformation. In addition, the second carbon material in the form of particles is contained in the pores of the porous structure, thus leading to the adsorption of a large amount of the electrolyte. Therefore, the actuator has sufficient durability to driving deformation, and the shape of the actuator can be largely deformed.

FIG. 1C is an enlarged schematic view of the porous structure of the electrodes 1 of the actuator according to this embodiment.

Reference numeral 5 denotes the porous structure serving as a skeletal structure. Reference numeral 6 denotes the pores. Reference numeral 7 denotes the second carbon material in the form of particles. Reference numeral 8 denotes a polymer. Reference numeral 9 denotes the first carbon material in the form of fibers. The porous structure 5 contains the polymer 8 and the first carbon material 9 in the form of fibers in its skeletal structure. The porous structure 5 may further contain an electrolyte in the skeletal structure. The second carbon material 7 in the form of particles and the electrolyte are contained in the pores 6. So, at least part of the surface of each particle of the second carbon material 7 is not covered with the polymer but is exposed or in direct contact with the electrolyte.

The electrode according to aspects of the present invention has the porous structure and contains the first carbon material in the form of fibers in its skeletal structure. Carbon materials in the form of fibers typically have high mechanical strength. The presence of the first carbon material in the skeletal structure increases the strength of the porous structure. Accordingly, even when the actuator is repeatedly driven and deformed, the electrode is less likely to be cracked or broken and has high durability. Furthermore, the use of a conductive carbon material in the form of fibers leads to the formation of a conductive network to impart conductivity to the electrode. In aspects of the present invention, the electrode contains the carbon material in the form of fibers in the skeletal structure and thus has high conductivity.

In aspects of the present invention, at least one of the electrodes 1 has the porous structure; hence, ions enters the pores 6. Ions can easily enter or can easily exit the electrode compared with non-porous electrode.

Furthermore, the skeletal structure of the porous structure according to this embodiment may contain at least one polymer. The polymer forms the skeleton and serves as a binder configured to hold the carbon material in the form of fibers at the skeletal structure.

The second carbon material in the form of particles are contained in the pores of the porous structure according to aspects of the present invention. The carbon material in the form of particles is present in the pores; hence, most of the surface of each particle of the carbon material is not covered with the polymer. So, ions can be easily adsorbed at the time of the application of a voltage. Furthermore, the mechanical strength of the skeleton of the porous structure results in the sufficient durability of the actuator. Thus, the carbon material may be simply held in the pores. That is, a polymer serving as a binder is not used or is used in a small amount. So, the concentration of the carbon material may be increased, thereby increasing the amount of ions adsorbed and increasing the amount of displacement of the actuator.

The electrolyte is present and in contact with the surface of the carbon material in the pores, so that ions can be readily adsorbed on the surface of the carbon material at the time of the application of a voltage.

Furthermore, a polymer may be present in the pores. The polymer may be in contact with part of the carbon material and used as a binder configured to hold the carbon material in the pores.

In this embodiment, the electrode has the porous structure containing the first carbon material in the form of fibers. The second carbon material in the form of particles is contained in the pores of the porous structure. The actuator including all these components has sufficient durability to driving deformation and can be largely deformed.

The carbon material in the form of fibers according to this embodiment has a sufficiently long length with respect to a fiber diameter. Here, the fiber diameter is in the range of 0.1 nm to 50 µm. The length is 10 or more times the fiber diameter. That is, the ratio of the length of the long axis to the length of the short axis, i.e., length of long axis/length of short axis, is 10 or more.

The first carbon material in the form of fibers according to this embodiment is carbon nanotubes, carbon nanofibers, or carbon fibers. Carbon nanotubes are materials in which six-membered carbon ring networks are formed into single- or multi-walled coaxial tubes. Carbon nanofibers are carbon materials in the form of fibers, the carbon materials each having a structure in which graphene sheets are stacked obliquely or perpendicularly to the longitudinal direction of the fiber, the carbon materials in the form of fibers having nanosized diameters. Carbon fibers are fibrous carbon materials having a carbon content of 90% or more and having the structure and properties of carbon and properties of a fiber material.

Carbon nanotubes may be used as the first carbon material in the form of fibers according to aspects of the present invention from the viewpoint of forming a layer having conductivity and elasticity. Carbon nanotubes are dispersed in an ionic liquid by subjecting the mixture to shear, thereby preparing a conductive gel with elasticity. Carbon nanotubes are carbon materials each having a shape in which a graphene sheet is cylindrically wound. Carbon nanotubes are roughly categorized into single-walled nanotubes (SWNT) and multi-walled nanotubes (MWNT) on the basis of the number of peripheral walls. In addition, various carbon nanotubes are known and categorized into chiral (helical) nanotubes, zigzag nanotubes, and armchair nanotubes on the basis of the difference in structure of graphene sheets. In aspects of the present invention, any type of carbon nanotube as described above may be used. Typically, single-walled nanotubes having a high aspect ratio, i.e., thin, long single-walled nanotubes, easily forms a gel. So, in aspects of the present invention, a gel-like composition may be formed from SWNT. An example of carbon nanotubes in practical use is, but not limited to, HiPco (manufactured by Carbon Nanotechnology Incorporated), which is produced from carbon monoxide and can be produced in relatively large quantity.

As the conductive material according to aspects of the present invention, a conductive polymer may be used. Examples of the conductive polymer include, but are not limited to, π-conjugated conductive polymers, such as polyacetylene, polyaniline, polypyrrole, polythiophene, poly-p-phenylene, polyphenylene vinylene, and polyazulene, and derivatives of these π-conjugated conductive polymers. These polymers may be used alone or in combination.

The electrodes used in aspects of the present invention may contain an electrolyte. To improve the dispersibility of carbon nanotubes, a carbon-nanotube gel composed of carbon nanotubes and an ionic liquid may be contained in the skeletal structure.

The proportion by weight of the first carbon material in the form of fibers in the electrode may be 1% by weight or more from the viewpoint of obtaining the conductivity of the electrode.

One or more first carbon materials in the form of fibers according to aspects of the present invention may be contained in the skeletal structure.

In the carbon material in the form of particles according to this embodiment, unlike the first carbon material in the form of fibers described above, the ratio of the length of the long axis to the length of the short axis, i.e., length of long axis/length of short axis, is less than 10. At a ratio of 10 or more, the carbon material can be less likely to be charged into the pores from the outside. The carbon material in the form of particles may have a primary particle size of 1 nm to 100 µm. At a particle size of less than 1 nm, ions can fail to be sufficiently adsorbed. At a particle size exceeding 50 µm, the carbon material can fail to be sufficiently charged into the pores.

The second carbon material in the form of particles according to this embodiment may be carbon black, activated carbon, or porous carbon. Carbon black is formed of fine carbon particles that are produced by an industrial process with controlled quality and that have diameters of about 3 to about 500 nm. Specific examples of carbon black include, but are not particularly limited to, acetylene black, furnace black, channel black, thermal black, and Ketjen Black. Activated carbon is a carbon material mainly containing carbon that has been subjected to chemical or physical treatment in order to increase the capability of adsorbing a solute in a gas or liquid. Porous carbon is a carbon material mainly containing carbon having pores. Specific examples of porous carbon include, but are not particularly limited to, nanoporous carbon, mesoporous carbon, and microporous carbon, which are classified depending on pore size.

One or more second carbon materials in the form of particles according to aspects of the present invention may be contained in the pores.

The proportion by weight of the second carbon material in the form of particles in the electrode may be 1% by weight or more for the purpose of increasing the number of sites configured to adsorb ions to provide a large amount of displacement.

In the actuator according to this embodiment, each of the pair of electrodes has the porous structure containing the first carbon material in the form of fibers, and the second carbon material in the form of particles is contained in the pores of the porous structure. In the actuator according to aspects of the present invention, at least one of the pair of electrodes may have the porous structure containing the first carbon material in the form of fibers, and the second carbon material in the form of particles may be contained in the pores of the porous structure.

In the actuator according to this embodiment, the plane of each of the electrodes may be rectangular as illustrated in the figure. In the actuator according to aspects of the present invention, the plane may be circular, triangular, elliptic, or spiral.

The operation of the actuator according to this embodiment will be described with reference to FIGS. 2A and 2B. FIG. 2A is a schematic view illustrating an undeformed state. FIG. 2B is a schematic view illustrating a deformed state.

An electrolyte 15 contained in an intermediate layer 11 is composed of the cations 13 and anions 14. Reference numeral 10 denotes electrodes 10. Reference numeral 12 denotes lead wires 12.

As illustrated in FIG. 2B, for example, in the case where a direct-current voltage is applied, the first electrode 17 and the second electrode 16 are relatively distinguished from each other, i.e., the first electrode 17 serves as a positive electrode, and the second electrode 16 serves as a negative electrode. So, the cations 13 in the intermediate layer 11 are transferred to the second electrode 16 serving as the negative electrode. The anions 14 are transferred to the first electrode 17 serving as the positive electrode.

Second Embodiment (Porous Structure Containing Conductive Polymer)

A second embodiment of the present invention will be described in detail below.

An actuator according to aspects of the present invention includes a pair of electrodes arranged oppositely and an intermediate layer arranged between the pair of electrodes, the intermediate layer containing an electrolyte, in which at least one of the pair of electrodes has a conductive polymer having a porous structure, and an electrolyte and a carbon material are contained in pores of the porous structure.

In this embodiment, each electrode has the porous structure containing the conductive polymer and thus has sufficient durability to deformation. In addition, the carbon material is contained in the pores of the porous structure, thereby providing the conductivity in the electrode. Furthermore, the electrode includes the pores containing the electrolyte, so that ions are easily transferred and diffused in the electrode. Thus, the actuator has sufficient durability to driving deformation and can be driven at a high driving speed.

FIG. 1B is an enlarged schematic view of the structure of the electrodes 1 of the actuator according to this embodiment.

Reference numeral 5 denotes the porous structure serving as a skeletal structure, Reference numeral 6 denotes the pores. Reference numeral 7 denotes the carbon material. The porous structure 5 contains the conductive polymer. The carbon material 7 and the electrolyte are contained in the pores 6. So, at least part of the surface of the carbon material 7 is not covered with the conductive polymer but is exposed or in direct contact with the electrolyte.

The electrode according to aspects of the present invention has the porous structure. The skeletal structure contains the conductive polymer. The carbon material is contained in the pores. Even if the concentration of the carbon material is increased in order to improve the conductivity, the flexibility of the skeletal structure containing the conductive polymer is maintained. Thus, even when the actuator is repeatedly driven and deformed, the electrode is less likely to be cracked or broken. In addition, the presence of the carbon material in the pores leads to the formation of a conductive network in the electrode even if the conductive polymer is in a dedoped state, thereby imparting conductivity to the electrode. Accordingly, the electrode having both conductivity and durability is provided.

As the conductive polymer according to aspects of the present invention, a conductive polymer may be used. Examples thereof include, but are not limited to, π-conjugated conductive polymers, such as polyacetylene, polyaniline, polypyrrole, polythiophene, poly-p-phenylene, polyphenylene vinylene, and polyazulene, and derivatives of these π-conjugated conductive polymers. These polymers may be prepared by chemical polymerization or electrolytic polymerization. Furthermore, these polymers may be used alone or in combination.

Each conductive polymer may or may not contain a dopant. The electrode has high conductivity. So, the conductive polymer may contain the dopant. Any dopant may be used as long as it has conductivity. Examples thereof include inorganic ions, such as $PF_6^-$, $BF_4^-$, $ClO_4^-$, $SbF_6^-$, and $SO_4^{2-}$; and organic ions, such as an alkylbenzenesulfonate ion, an alkylnaphthalenesulfonate ion, a sulfonate ion, and a trifluoromethanesulfonate ion.

The carbon material in the pores according to this embodiment has conductivity. The use of the carbon material having conductivity imparts conductivity to the electrode. In addition, ions are adsorbed on the carbon material to increase the amount of displacement of the actuator at the time of the application of a voltage.

The carbon material according to this embodiment may be carbon black, activated carbon, porous carbon, carbon nanotubes, carbon nanofibers, and carbon fibers.

Carbon black is formed of fine carbon particles that are produced by an industrial process with controlled quality and that have diameters of about 3 nm to about 500 nm. Specific examples of carbon black include, but are not particularly limited to, acetylene black, furnace black, channel black, thermal black, and Ketjen Black.

Activated carbon is a carbon material mainly containing carbon that has been subjected to chemical or physical treatment in order to increase the capability of adsorbing a solute in a gas or liquid.

Porous carbon is a carbon material mainly containing carbon having pores. Specific examples of porous carbon include, but are not particularly limited to, nanoporous carbon, mesoporous carbon, and microporous carbon, which are classified depending on pore size.

Carbon nanotubes are materials in which six-membered carbon ring networks are formed into single- or multi-walled coaxial tubes.

Carbon nanofibers are carbon materials in the form of fibers, the carbon materials each having a structure in which graphene sheets are stacked obliquely or perpendicularly to the longitudinal direction of the fiber, the carbon materials in the form of fibers having nanosized diameters. Carbon fibers are fibrous carbon materials having a carbon content of 90% or more and having the structure and properties of carbon and properties of a fiber material. Carbon fibers each have a sufficiently long length with respect to a fiber diameter. Here, the fiber diameter is in the range of 0.1 nm to 50 μm. The length is 10 or more times the fiber diameter.

One or more carbon materials according to aspects of the present invention may be contained in the pores.

The carbon material according to this embodiment may have a size of 1 nm to 50 μm in the longitudinal direction. A size of less than 1 nm can fail to sufficiently adsorb ions. A size exceeding 50 μm can fail to sufficiently charge the carbon material into the pores.

The proportion by weight of the carbon material in the electrode may be 1% by weight or more for the purpose of increasing the number of sites configured to adsorb ions to provide a large amount of displacement.

In the actuator according to this embodiment, the plane of each of the electrodes may be rectangular as illustrated in the figure. In the actuator according to aspects of the present invention, the plane may be circular, triangular, elliptic, or spiral.

The operation of the actuator according to this embodiment will be described with reference to FIGS. 2A and 2B. FIG. 2A is a schematic view illustrating an undeformed state. FIG. 2B is a schematic view illustrating a deformed state.

The electrolyte 15 contained in the intermediate layer 11 is composed of the cations 13 and the anions 14. Reference numeral 10 denotes the electrodes 10. Reference numeral 12 denotes the lead wires 12.

As illustrated in FIG. 2B, for example, in the case where a direct-current voltage is applied, the first electrode 17 and the second electrode 16 are relatively distinguished from each other, i.e., the first electrode 17 serves as a positive electrode, and the second electrode 16 serves as a negative electrode. So, the cations 13 in the intermediate layer 11 are transferred to the second electrode 16 serving as the negative electrode. The anions 14 are transferred to the first electrode 17 serving as the positive electrode.

The electrode may contain the electrolyte in an undeformed state from the viewpoint of providing rapid deformation of the actuator at the time of the application of a voltage. In this case, the proportion of the electrolyte in the electrode may be 80% by weight or less. A proportion exceeding 80% by weight can result in the electrode with low mechanical strength. The term "% by weight" used here indicates the proportion of the weight of the electrolyte with respect to the total weight of the electrolyte, the polymer, and the carbon material in the electrode.

The electrode has the porous structure, so that the electrolyte is transferred to a distal portion of the electrode. Alternatively, a large amount of the electrolyte contained in the electrode.

The intermediate layer according to this embodiment may be an ionic liquid, which is non-volatile at ordinary temperature. The actuator according to this embodiment can be deformed in air or vacuum.

In FIG. 2B, a pair of electrodes 16 and 17 are illustrated as a positive electrode and a negative electrode, respectively. The deformation can be returned to the initial state by not applying an electric field or an extremely high electric field to cause the diffusion of ions.

While the pair of electrodes 16 and 17 are illustrated as the positive electrode and the negative electrode, respectively, in FIG. 2B, for example, the electrodes may serve as the positive electrode and the negative electrode alternately and repeatedly by AC-driving the actuator. In this case, in addition to returning the deformation, the actuator can be deformed in the opposite direction to the direction illustrated in the figure.

Other Embodiments

The actuator according to aspects of the present invention may be used for actuators of robots that deal with human beings and that are required to have flexibility and safety, robot hands and manipulators, and driving sources of machinery, medical and welfare robots, such as surgical devices and assisted suits, and micromachines.

EXAMPLES

While aspects of the present invention will be described in detail by examples, the present invention is not limited to the examples.

Example 1

An actuator was produced as described below, the actuator including electrode layers arranged oppositely and an intermediate layer provided therebetween, the electrode layers each having a porous structure provided with a skeletal structure, carbon nanotubes being contained in the skeletal structure, and Ketjen Black being contained in pores of the porous structure.

To form the intermediate layer, an ionic composition containing an ionic liquid and a polymer was prepared. First, 100 mg of a polyvinylidene fluoride-hexafluoropropylene copolymer (PVdF (HFP)) represented by a chemical formula described below, 100 mg of 1-butyl-3-methylimidazolium tetrafluoroborate ($BMIBF_4$, manufactured by Kanto Chemical Co., Inc.), and 1 mL of N,N-dimethylacetamide (DMAc, manufactured by Kishida Chemical Co., Ltd.) were mixed at 80° C. to prepare ionic composition 18 containing the ionic liquid and the polymer. Ionic composition 18 was colorless and transparent.

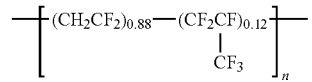

wherein in the formula, n represents the number of repeating units.

Ionic composition 18 was poured into a substrate provided with 100-μm-thick spacers, leveled off using the spacers as a guide, and dried at room temperature, thereby providing the intermediate layer.

The electrode layers each having the porous structure was formed as described below, the carbon nanotubes being contained in the skeletal structure, and Ketjen Black being contained in the pores of the porous structure.

A conductive material dispersion containing carbon nanotubes (CNTs), which are conductive materials, dispersed uniformly was prepared as follows: First, 1 mL of an organic solvent (2-pyrrolidone (NMP), manufactured by Kishida Chemical Co., Ltd.) was added to 50 mg of single-walled carbon nanotubes (SWNTs) (trade name: HiPco, manufactured by Carbon Nanotechnology Incorporated) serving as a conductive material and 100 mg of $BMIBF_4$ serving as an ionic liquid. The mixture was subjected to dispersion with a ball mill (planetary pulverizer, manufactured by Fritsch Corp.) using zirconia balls (diameter: 2 mm) at 200 rpm for 30 minutes. A solution of 80 mg of PVdF (HFP) dissolved in 2 mL of NMP was added to the resulting composition produced using the ball mill. The mixture was subjected to dispersion with the ball mill at 500 rpm for 50 minutes, thereby preparing the conductive dispersion.

The conductive dispersion was diluted with 3 mL of NMP. The diluted conductive dispersion was cast on a Teflon (registered trademark) sheet. The resulting cast film was immersed in an NMP/methanol/water (40/40/60) mixed solvent (ratio by weight) and allowed to stand for 24 hours. Then the film was removed from the NMP/methanol/water mixed solvent and dried at 110° C. to provide a 75-μm-thick electrode layer having a porous structure.

Next, 0.05 g of Ketjen Black (KB, manufactured by Lion Corporation) was added to 5 g of $BMIBF_4$. The mixture was subjected to stirring and ultrasonic dispersion to provide a KB dispersion. The foregoing electrode layer having the porous structure was immersed in the KB dispersion and allowed to stand for 24 hours under vacuum, thereby providing the electrode layer having the porous structure, KB and the ionic liquid being contained in pores.

Another electrode layer was produced by the same process.

The electrode layer, the intermediate layer, and the electrode layer were stacked in that order. The stack was fused by heat and pressure using a hot press (manufactured by Tester Sangyo Co., Ltd.) at 110° C. and 1 kN to provide a laminate having a thickness of 160 μm. The laminate was cut into a strip measuring 1 mm wide by 12 mm long, thereby providing an actuator 100.

Observations of the cross section of the actuator with a scanning electron microscope (trade name: S-4800, manufactured by Hitachi High-Technologies Corporation.) showed that each of the electrode layers had a porous structure with pores each having a pore size of 0.1 to 1 μm, KB was held in the pores, and the intermediate layer was arranged between the pair of the electrode layers.

Comparative Example 1

To check the effects of the porous structure and the first conductive material in Example 1, a uniform electrode layer containing SWNTs, PVdF (HFP), and $BMIBF_4$ was formed without incorporation of KB.

As with Example 1, a conductive dispersion was prepared. The conductive dispersion was poured into a substrate provided with 100-μm-thick spacers, leveled off using the spacers as a guide, and dried at room temperature, thereby providing the electrode layer having a thickness of 75 μm. Another electrode layer was produced by the same process.

The resulting two electrode layers and an intermediate layer formed in the same way as in Example 1 were stacked in the following order: the electrode layer, the intermediate layer, and the electrode layer. The stack was fused by heat and pressure using a hot press (manufactured by Tester Sangyo Co., Ltd.) at 110° C. and 1 kN to provide a laminate having a thickness of 160 μm. The laminate was cut into a strip measuring 1 mm wide by 12 mm long, thereby providing an actuator 200.

Observations of the cross section of the actuator 200 with a scanning electron microscope (trade name: S-4800, manufactured by Hitachi High-Technologies Corporation.) showed that the intermediate layer was arranged between the pair of the electrode layers and that each of the electrode layers did not have a pore and was formed of a uniform film.

Comparative Example 2

To make a comparison with the example, a uniform electrode layer containing KB and $BMIBF_4$ in PVdF (HFP) was formed.

A conductive dispersion was prepared as in Example 1, except that KB was used in place of SWNTs. The conductive dispersion was poured into a substrate provided with 100-μm-thick spacers, leveled off using the spacers as a guide, and dried at room temperature, thereby providing the electrode layer having a thickness of 75 μm. Another electrode layer was produced by the same process.

The resulting two electrode layers and an intermediate layer formed in the same way as in Example 1 were stacked in the following order: the electrode layer, the intermediate layer, and the electrode layer. The stack was fused by heat and pressure using a hot press (manufactured by Tester Sangyo Co., Ltd.) at 110° C. and 1 kN to provide a laminate having a thickness of 160 μm. The laminate was cut into a strip measuring 1 mm wide by 12 mm long, thereby providing an actuator 300.

Observations of the cross section of the actuator 300 with a scanning electron microscope (trade name: S-4800, manufactured by Hitachi High-Technologies Corporation.) showed that the intermediate layer was arranged between the pair of the electrode layers and that each of the electrode layers contained KB, did not have a pore, and was formed of a uniform film.

Evaluation of Amount of Displacement

The amount of displacement when an actuator is bent is measured with a laser displacement meter. An end portion (fixed end), which extends from an end to a position 2 mm from the end, of the actuator measuring 1 mm wide by 12 mm length is held by a holder provided with electrodes. A 0.1-Hz triangular wave with an amplitude of 1.0 V is applied to the actuator in air (driven in air) to cause bending. The amount of displacement is evaluated by measuring the amount of displacement at a position 8 mm from the fixed end using the laser displacement meter.

The amount of displacement of the actuator 100 produced in Example 1 was 0.47 mm. The amount of displacement of the actuator 200 produced in Comparative Example 1 was 0.18 mm. That is, the amount of displacement of the actuator 100 was 2.6 times larger than that of the actuator 200.

The amount of displacement of each of the actuators 100 and 200 was not changed even after 5000 cycles of bending. In contrast, the actuator 300 was not displaced after a voltage was applied several times. Observations of the electrode layers showed that the electrode layers had many cracks.

Accordingly, the foregoing examples demonstrated that the use of the electrodes each having the porous structure composed of the polymer fibers containing CNTs and the pores of the porous structure filled with KB and $BMIBF_4$ provided the actuator having a large amount of displacement and high bending flexibility.

The present invention is not limited to the above embodiments and various changes and modifications can be made within the spirit and scope of the present invention. Therefore to apprise the public of the scope of the present invention, the following claims are made.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-286532 filed Dec. 22, 2010, which is hereby incorporated by reference herein in its entirety.

What is claimed is:

1. An actuator comprising:
    a pair of electrodes arranged oppositely; and
    an intermediate layer arranged between the pair of electrodes, the intermediate layer containing an electrolyte, and the actuator being deformed by applying a voltage to the pair of electrodes,
    wherein at least one of the pair of electrodes includes
    a porous structure containing a first conductive material and having conductivity, a second conductive material, and an electrolyte, pores of the porous structure being filled with the second conductive material and the electrolyte.

2. The actuator according to claim 1, wherein the porous structure contains a polymer material and a first carbon material serving as the first conductive material, and wherein the first carbon material contains at least one selected from carbon black, activated carbon, porous carbon, carbon nanotubes, carbon nanofibers, and carbon fibers.

3. The actuator according to claim 1, wherein the porous structure contains a conductive polymer.

4. The actuator according to claim 1, wherein the second conductive material is at least one selected from carbon black, activated carbon, and porous carbon.

5. The actuator according to claim 1, wherein the electrolyte is an ionic liquid.

\* \* \* \* \*